(12) United States Patent
Lin

(10) Patent No.: US 9,880,957 B2
(45) Date of Patent: *Jan. 30, 2018

(54) ELECTRONIC DEVICE GROUP-COUPLING SYSTEM AND METHOD

(71) Applicant: HON HAI PRECISION INDUSTRY CO., LTD., New Taipei (TW)

(72) Inventor: Ching-Chung Lin, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 325 days.

This patent is subject to a terminal disclaimer.

(21) Appl. No.: 14/682,894

(22) Filed: Apr. 9, 2015

(65) Prior Publication Data

US 2016/0188507 A1  Jun. 30, 2016

(30) Foreign Application Priority Data

Dec. 31, 2014  (CN) .......................... 2014 1 0852755

(51) Int. Cl.
    *H05K 7/10*     (2006.01)
    *G06F 13/362*     (2006.01)
    *G06F 13/42*     (2006.01)

(52) U.S. Cl.
    CPC ........ *G06F 13/362* (2013.01); *G06F 13/4282* (2013.01)

(58) Field of Classification Search
    None
    See application file for complete search history.

(56) References Cited

U.S. PATENT DOCUMENTS

| | | | | |
|---|---|---|---|---|
| 6,680,904 B1* | 1/2004 | Kaplan | ................... | H04L 12/56 370/217 |
| 6,779,046 B1* | 8/2004 | Osuga | ....................... | G06F 1/12 710/14 |
| 2002/0059372 A1 | 5/2002 | Goshev et al. | | |
| 2010/0299401 A1* | 11/2010 | Lloyd | .................... | G06F 15/16 709/209 |
| 2012/0215874 A1* | 8/2012 | Sequeira | ................ | H04L 12/12 709/208 |
| 2013/0246663 A1* | 9/2013 | Raveendran | ........ | G06F 13/4022 710/8 |

(Continued)

*Primary Examiner* — Elias Mamo
(74) *Attorney, Agent, or Firm* — Steven Reiss

(57) ABSTRACT

An electronic device coupling system includes a master electronic device and a plurality of slave electronic devices which are each independently connected to the master. The master electronic device includes connecting module and identity module, the slave electronic device includes coupling module and identify module. The identity module stores identity information of each slave device and sends out serially all the identity information. The identify module confirms correspondence of the identity information to a selected slave device. The connecting module has a plurality of matching codes corresponding to each connecting port and each group address code. The master device can couple to a slave device when the identity information corresponds to a selected slave device. The coupling module is couplable to the connecting module according to the matching codes. An electronic device coupling method is further provided.

19 Claims, 10 Drawing Sheets

(56) References Cited

U.S. PATENT DOCUMENTS

2014/0201400 A1* 7/2014 Beel .................... G06F 3/04842
                                                            710/63
2016/0140067 A1* 5/2016 Gately .................. G06F 13/364
                                                            710/110

* cited by examiner

ELECTRONIC DEVICE GROUP-COUPLING SYSTEM AND METHOD

FIELD

The subject matter herein generally relates to data transmission technology.

BACKGROUND

Electronic devices, such as electronic white boards, are coupled to slave devices, such as mobile phones, universal serial buses (USBs), and so on. The slave devices can be connected to the main electronic devices in parallel.

BRIEF DESCRIPTION OF THE DRAWINGS

Implementations of the present technology will now be described, by way of example only, with reference to the attached figures.

DETAILED DESCRIPTION

Figure 1:
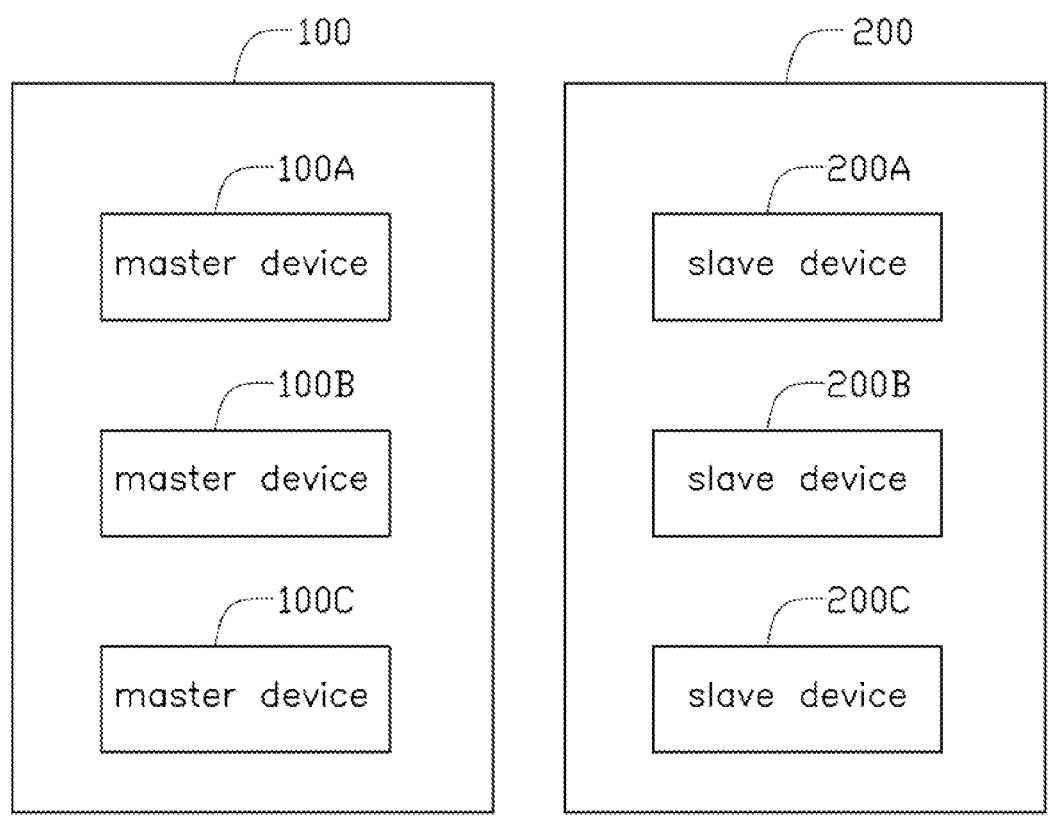
FIG. 1 is a block diagram of one embodiment of three master devices and three slave devices of an electronic device coupling system.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series, and the like.

FIG. 1 illustrates an electronic device coupling system in accordance with an embodiment. The electronic device coupling system can include a plurality of master devices 100A-100C in a master area 100 and a plurality of slave devices 200A-200C in a slave area 200. In at least one embodiment, each master device can be a monitor, a television (TV), a mobile phone, a tablet computer, an all-in-one computer, or other electronic device; and each slave device can be a monitor, a TV, a mobile phone, a tablet computer, an all-in-one computer, a power supply, a hard disk, a router, and so on. Each master device can be coupled to each slave device via a wireless method, such as BLUETOOTH, wireless fidelity (WIFI), near field communication (NFC), infrared, and wireless gigabit (WIGIG).

Figure 2:
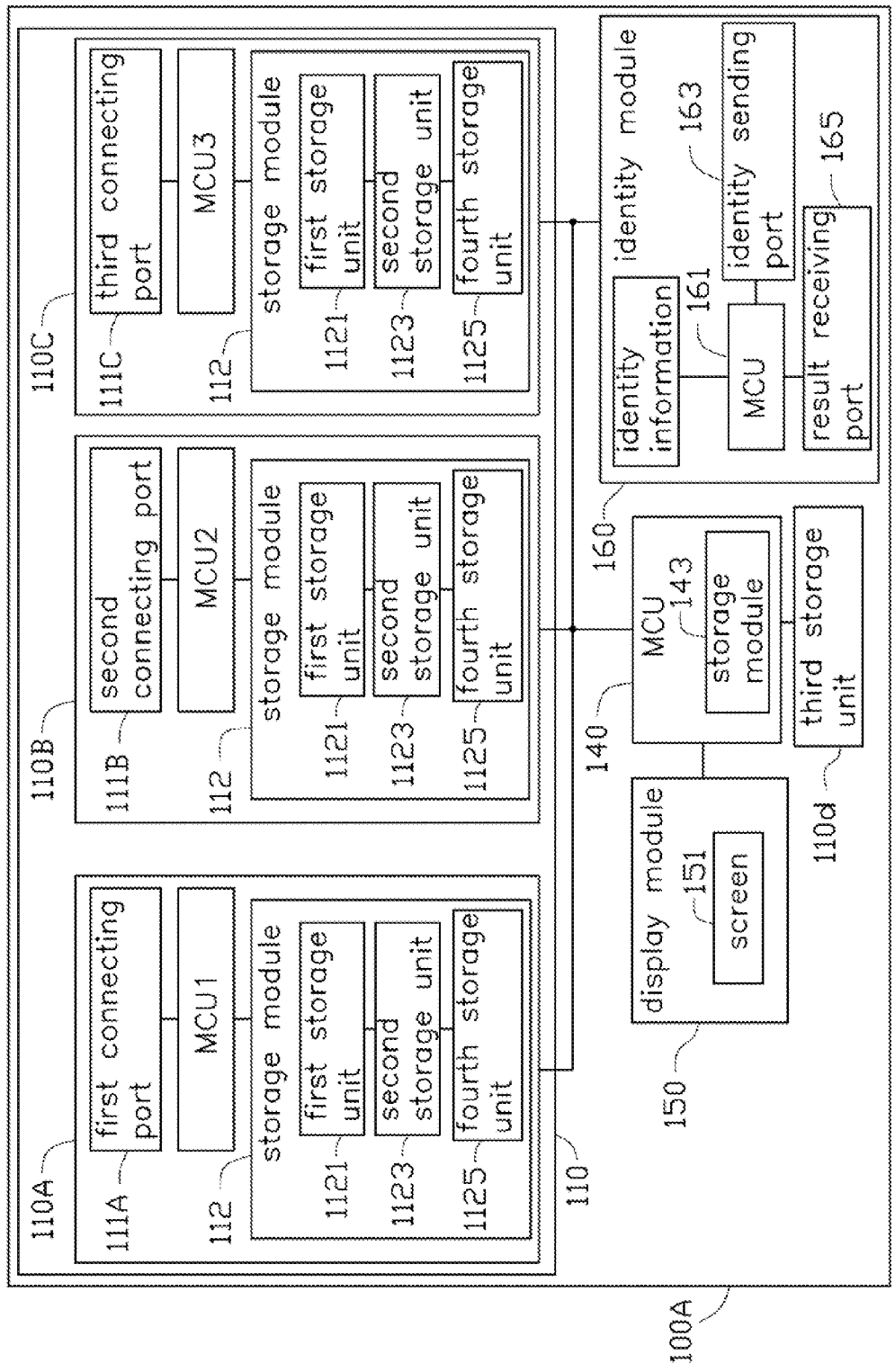
FIG. 2 is a block diagram of one of the three master devices of the electronic device coupling system of FIG. 1.
Figure 3:
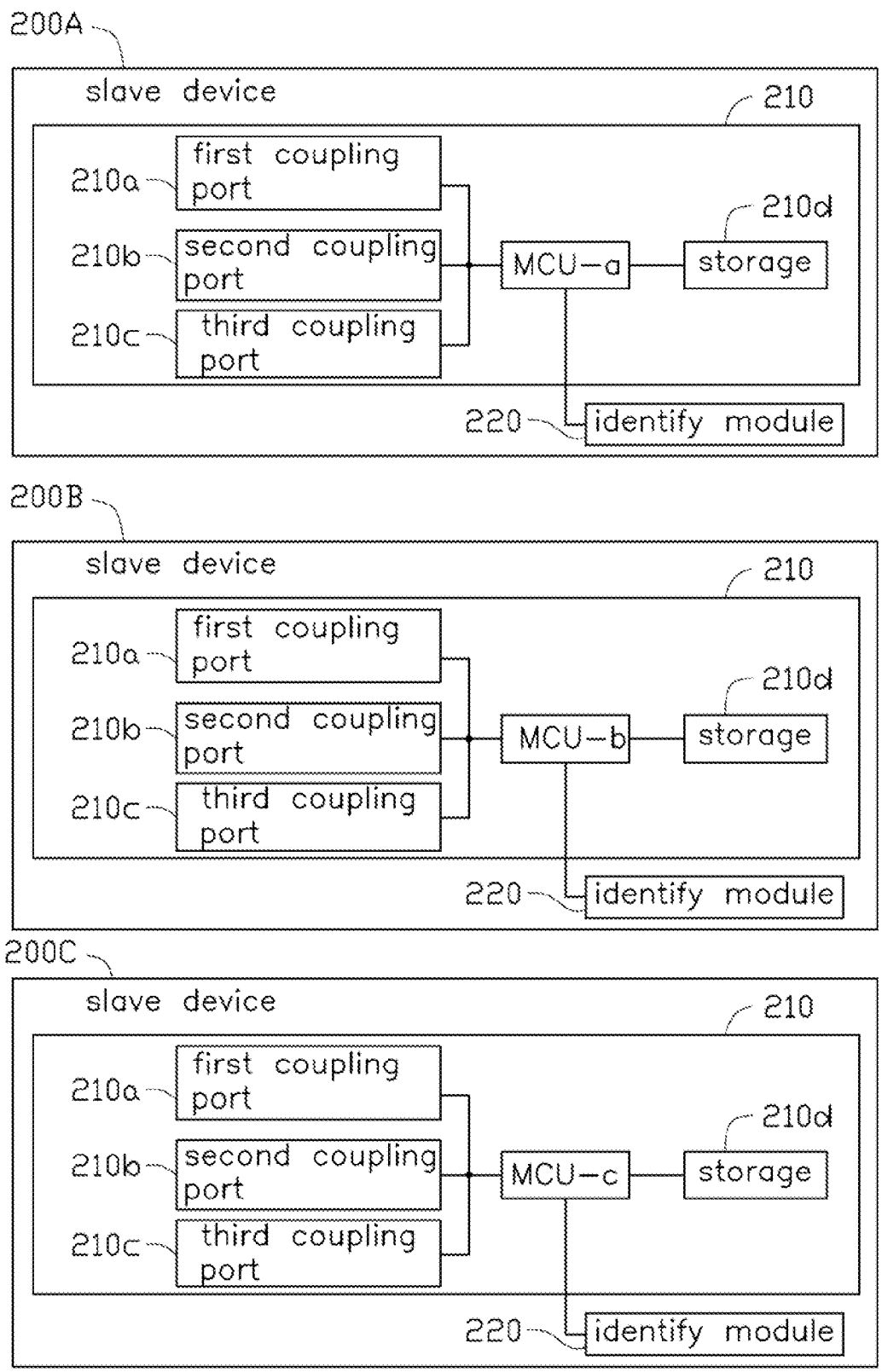
FIG. 3 is a block diagram of three example slave devices of the electronic device coupling system of FIG. 1.
Figure 4:
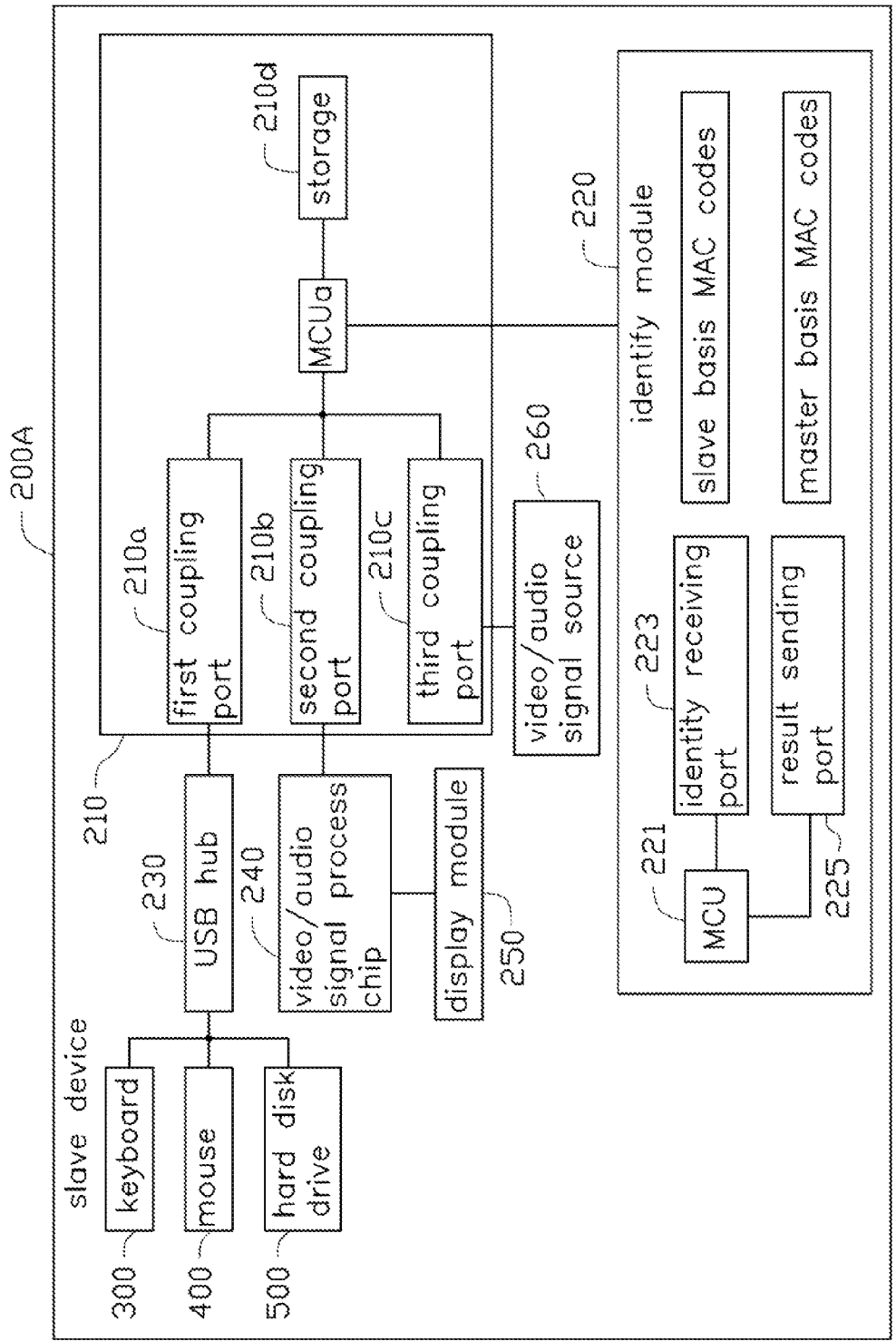
FIG. 4 is a block diagram of one of the three example slave devices of FIG. 3.

FIGS. 2-4 illustrate that each master device 100A-100C can include a connecting module 110, and the connecting module 110 can include a plurality of connecting port assemblies 110A-110C. Connecting port assembly 110A can include a first connecting port 111A. Connecting port assembly 110B can include a second connecting port 111B. Connecting port assembly 110C can include a third connecting port 111C.

Each slave device 200A, 200B, and 200C can include a coupling module 210 which is couplable to the connecting module 110, and the coupling module 210 can include a first coupling port 210$a$, a second coupling port 210$b$, a third coupling port 210$c$, and a storage device 210$d$. The first coupling port 210$a$ is couplable to the first connecting port 111A. The second coupling port 210$b$ is couplable to the second connecting port 111B. The third coupling port 210$c$ is couplable to the third connecting port 111C.

The type of the first coupling port 210$a$ is different from the types of the second coupling port 210$b$ and the third coupling port 210$c$, and the second coupling port 210$b$ is different from the third coupling port 210$c$. The type of each first coupling port 210$a$ is same as the type of the first connecting port 111A. The type of each second coupling port 210$b$ is same as the type of the second connecting port 111B. The type of each third coupling port 210$c$ is same as the type of the third connecting port 111C. In at least one embodiment, the types of the first coupling port 210$a$, the second coupling port 210$b$, and the third coupling port 210$c$ may be WIFI or BLUETOOTH, or WIGIG.

Each of the connecting port assemblies 110A-110C is coupled to an MCU 140 of the master device 100 via a control bus. The control bus can be an I2C bus or a UART bus or both. The MCU 140, through the control bus, can send control signals to the first coupling port 210$a$, the second coupling port 210$b$, and the third coupling port 210$c$ of each slave device 200A-200C via the first connecting port 111A, the second connecting port 111B, and the third connecting port 111C. The slave devices 200A-200C have an MCU-a, an MCU-b, and an MCU-c respectively. Each of the MCU-a, the MCU-b, and the MCU-c can receive the control signals and perform functions according to the control signals. The respective storages devices 210$d$ of the slave devices 200A-200C can store system softwares, function control codes, software group codes, group address codes, and port matching codes.

The connecting port assembly 110A further includes an MCU1 and a storage module 112. The connecting port assembly 110B further includes an MCU2 and a storage module 112. The connecting port assembly 110C further includes an MCU3 and a storage module 112. Each storage module 112 can include a first storage unit 1121, a second storage unit 1123, and a fourth storage unit 1125.

The first storage unit 1121 of the connecting port assembly 110A stores matching codes of the first coupling port(s) 210a and the first connecting port 111A. For example, if each of the slave devices 200A-200C is matched with the master device 100A, the matching codes stored in the first storage unit 1121 of the connecting port assembly 110A will be 200A210a-01, 200B210a-02, and 200C210a-03. The indicators 01, 02, and 03 are ground address codes of the slave devices 200A, 200B, and 200C respectively. The indicators 200A210a, 200B210a, and 200C210a are port codes.

The first storage unit 1121 of the connecting port assembly 110B stores matching codes of the second coupling port(s) 210b and the second connecting port 111B. For example, if the slave devices 200A-200C are matched with the master device 100, the matching codes stored in the first storage unit 1121 of the connecting port assembly 110B will be 200A210b-01, 200B210b-02, and 200C210b-03. The indicators 200A210b, 200B210b, and 200C210b are port codes.

The first storage unit 1121 of the connecting port assembly 110C stores matching codes of the third coupling port(s) 210c and the third connecting port 111C. For example, if the slave devices 200A-200C are matched with the master device 100, the matching codes stored in the first storage unit 1121 of the connecting port assembly 110C will be 200A210c-01, 200B210c-02, and 200C210c-03. The indicators 200A210c, 200B210c, and 200C210c are port codes.

Each of the master devices 100A-100C further includes a third storage unit 110d coupled to the MCU 140. The third storage unit 110d stores function control software of all the slave devices 200A-200C. The third storage unit 110d has pre-stored function control software of each type of slave device, such as tablet computer, mobile phone, power supply, hard disk, TVs, router, radio and so on. The function control software can be volume control, channel adjustment, brightness adjustment, power on/off control, and so on. The ground address codes can couple together the relevant function control software and the coupling module 210 to the connecting module 110. Each of the master devices 100A-100C can control each coupled slave device 200A-200C through the function control software, to provide volume adjustment, channel adjustment, brightness adjustment, powering on/off the coupled slave device 200A-200C, and so on.

For example, the function control software of the slave device 200A can be FW1, the function control software of the slave device 200B can be FW2, and the function control software of the slave device 200C can be FW3. The software matching code of the slave device 200A is 110dFW1-01. The software matching code of the slave device 200B is 110dFW2-02. The software matching code of the slave device 200C is 110dFW3-03. If the slave device 200A is a TV, the function control software FW1 provides volume adjustment, brightness adjustment, power on/off control, and channel adjustment, and software codes corresponding to the function control software FW1 are stored in the storage device 210d of the slave device 200A. If the slave device 200B is a radio, the function control software FW2 provides volume adjustment, power on/off control, and channel adjustment, and software codes corresponding to the function control software FW2 are stored in the storage device 210d of the slave device 200B. The third storage unit 110d stores function control softwares FW1, FW2, and FW3 for all the slave devices 200A-200C.

The second storage unit 1123 of each of the connecting port assemblies 110A-110C stores the group address codes (01, 02, and 03) of all the slave devices 200A-200C. The group address code 01 corresponds to the matching codes 200A210a-01, 200A210b-01, 200A210c-01, and 110dFW1-01. The group address code 02 corresponds to the matching codes 200B210a-02, 200B210b-02, 200B210c-02, and 110dFW2-02. The group address code 03 corresponds to the matching codes 200C210a-03, 200C210b-03, 200C210c-03, and 110dFW3-03.

Figure 5:
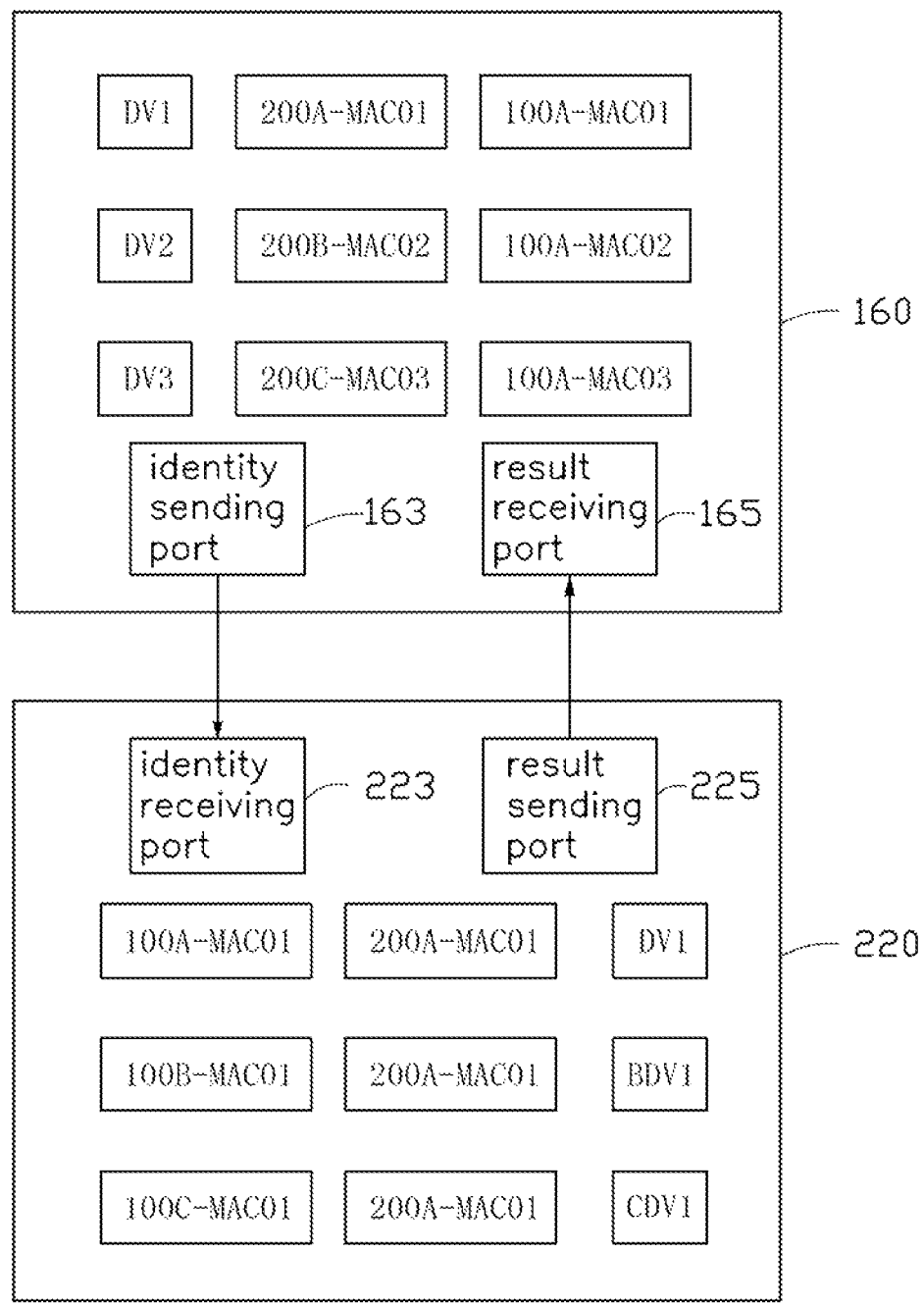
FIG. 5 is a block diagram of an identity module of a master device and an identify module of a slave device of the electronic device coupling system of FIG. 1.
Figure 6:
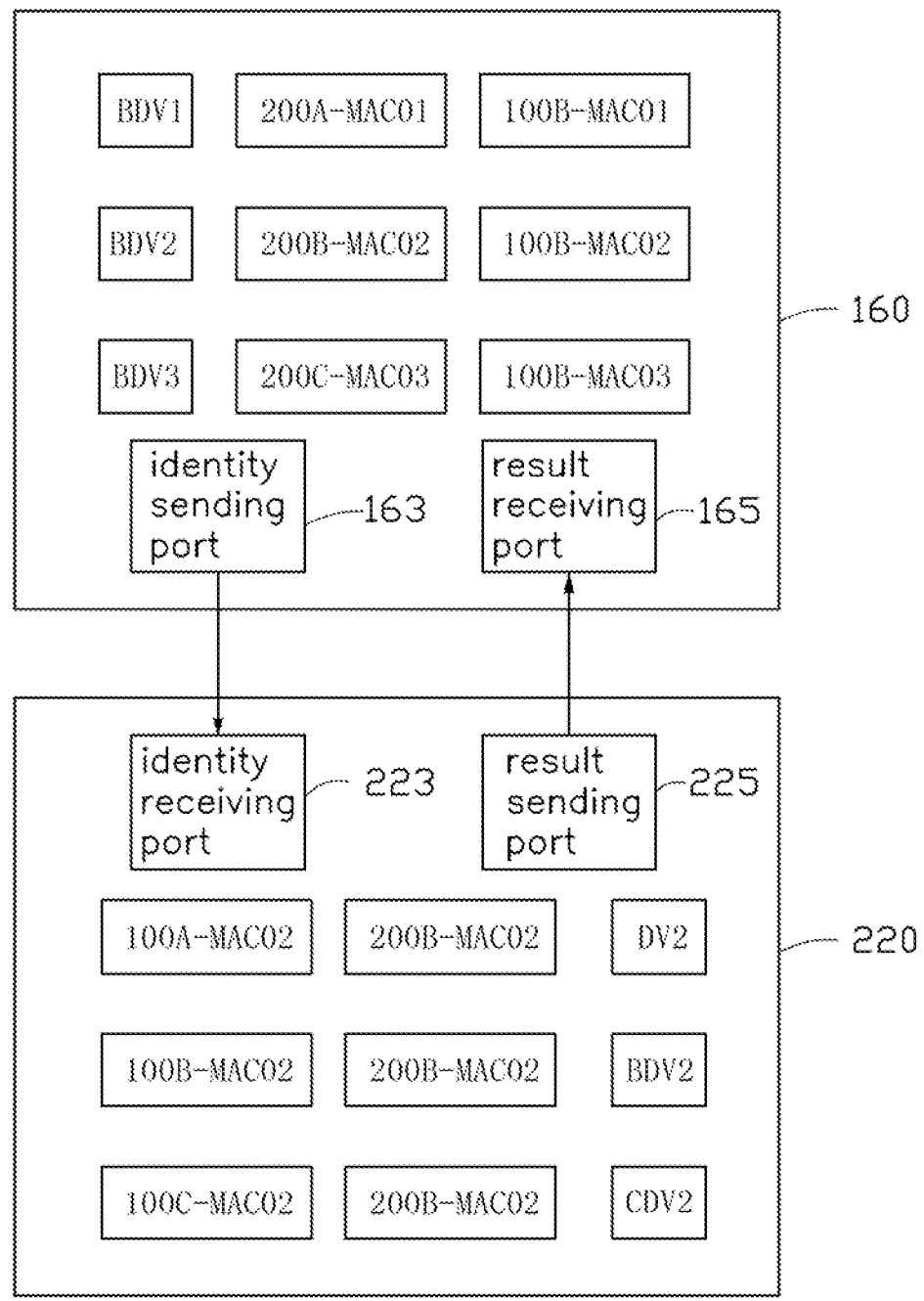
FIG. 6 is a block diagram of an identity module of a master device and an identify module of a slave device of the electronic device coupling system of FIG. 1.
Figure 7:
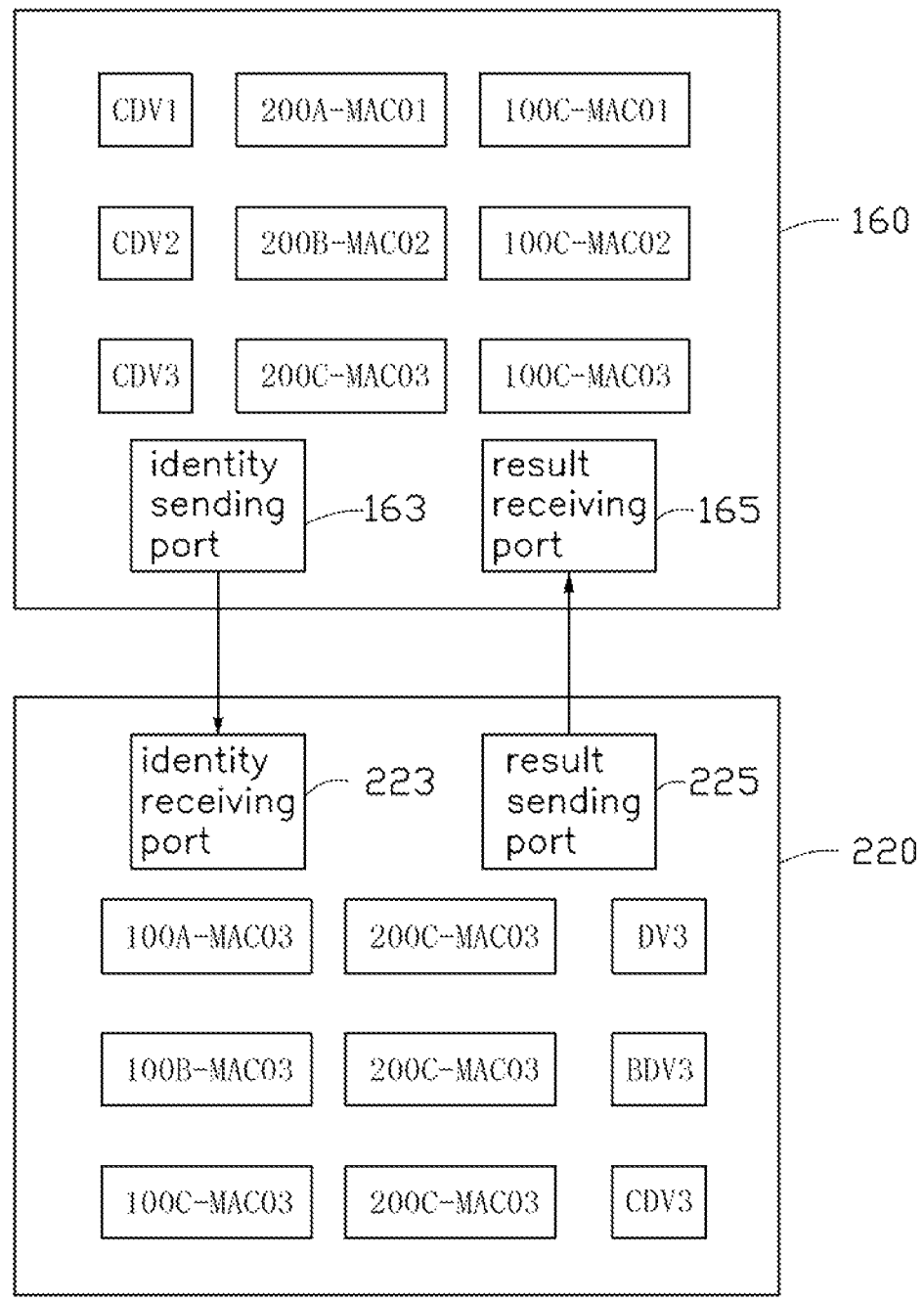
FIG. 7 is a block diagram of an identity module of a master device and an identify module of a slave device of the electronic device coupling system of FIG. 1.

FIGS. 5-7 illustrate that each of the master devices 100A-100C can further include an identity module 160. The identity module 160 stores a plurality of identity information, such as master basis MAC codes, slave basis MAC codes, and group address codes corresponding to each master device and each slave device matched to the master device.

If the master device 100A is matched to the slave device 200A, the identity information stored in the identity module 160 is a serial matching code: DV1-200A-MAC01 (210a&210b&210c)-100A-MAC01(110A&110B&110C). 200A-MAC01(210a&210b&210c) is the slave basis MAC code of the slave device 200A. MAC01(210a&210b&210c) is a composition of MAC codes of all the port codes of the first coupling port 210a, the second coupling port 210b, and the third coupling port 210c of the slave device 200A. 100A-MAC01(110A&110B&110C) is the master basis MAC code of the master device 100A. MAC01 (110A&110B&110C) is a composition of MAC codes of all the port codes of the plurality of connecting port assemblies 110A-110C of the master device 100A. DV1 is a group address code corresponding to the master basis MAC code of the master device 100A and the slave basis MAC code of the master device 200A.

If the master device 100A is matched to the slave device 200B, the identity information stored in the identity module 160 is a serial matching code: DV2-200B-MAC01 (210a&210b&210c)-100A-MAC01(110A&110B&110C). 200B-MAC01(210a&210b&210c) is the slave basis MAC code of the slave device 200B. MAC01(210a&210b&210c) is a composition of MAC codes of all the port codes of the first coupling port 210a, the second coupling port 210b, and the third coupling port 210c of the slave device 200B. DV2 is a group address code corresponding to the master basis MAC code of the master device 100A and the slave basis MAC code of the master device 200B.

If the master device 100A is matched to the slave device 200C, the identity information stored in the identity module 160 is a serial matching code: DV3-200C-MAC01 (210a&210b&210c)-100A-MAC01(110A&110B&110C). 200C-MAC01(210a&210b&210c) is the slave basis MAC code of the slave device 200C. MAC01(210a&210b&210c) is a composition of MAC codes of all the port codes of the first coupling port 210a, the second coupling port 210b, and the third coupling port 210c of the slave device 200C. DV3 is a group address code corresponding to the master basis MAC code of the master device 100A and the slave basis MAC code of the master device 200C.

Similar to the master device 100A, if the master device 100B is matched to the slave device 200A, the identity information stored in the identity module 160 is a serial matching code: BDV1-200A-MAC01(210*a*&210*b*&210*c*)-100B-MAC01(110A&110B&110C). 200A-MAC01 (210*a*&210*b*&210*c*) is the slave basis MAC code of the slave device 200A. MAC01(210*a*&210*b*&210*c*) is a composition of MAC codes of all the port codes of the first coupling port 210*a*, the second coupling port 210*b*, and the third coupling port 210*c* of the slave device 200A. 100B-MAC01(110A&110B&110C) is the master basis MAC code of the master device 100B. MAC01(110A&110B&110C) is a composition of MAC codes of all the port codes of the plurality of connecting port assemblies 110A-110C of the master device 100B. BDV1 is a group address code corresponding to the master basis MAC code of the master device 100B and the slave basis MAC code of the master device 200A.

If the master device 100B is matched to the slave device 200B, the identity information stored in the identity module 160 is a serial matching code: BDV2-200B-MAC01 (210*a*&210*b*&210*c*)-100B-MAC01(110A&110B&110C). 200B-MAC01(210*a*&210*b*&210*c*) is the slave basis MAC code of the slave device 200B. MAC01(210*a*&210*b*&210*c*) is a composition of MAC codes of all the port codes of the first coupling port 210*a*, the second coupling port 210*b*, and the third coupling port 210*c* of the slave device 200B. BDV2 is a group address code corresponding to the master basis MAC code of the master device 100B and the slave basis MAC code of the master device 200B.

If the master device 100B is matched to the slave device 200C, the identity information stored in the identity module 160 is a serial matching code: BDV3-200C-MAC01 (210*a*&210*b*&210*c*)-100B-MAC01(110A&110B&110C). 200C-MAC01(210*a*&210*b*&210*c*) is the slave basis MAC code of the slave device 200C. MAC01(210*a*&210*b*&210*c*) is a composition of MAC codes of all the port codes of the first coupling port 210*a*, the second coupling port 210*b*, and the third coupling port 210*c* of the slave device 200C. BDV3 is a group address code corresponding to the master basis MAC code of the master device 100B and the slave basis MAC code of the master device 200C.

Similar to the master device 100A and the master device 100B, if the master device 100C is matched to the slave device 200A, the identity information stored in the identity module 160 is a serial matching code: CDV1-200A-MAC01 (210*a*&210*b*&210*c*)-100C-MAC01(110A&110B&110C). 200A-MAC01(210*a*&210*b*&210*c*) is the slave basis MAC code of the slave device 200A. MAC01(210*a*&210*b*&210*c*) is a composition of MAC codes of all the port codes of the first coupling port 210*a*, the second coupling port 210*b*, and the third coupling port 210*c* of the slave device 200A. 100C-MAC01(110A&110B&110C) is the master basis MAC code of the master device 100C. MAC01 (110A&110B&110C) is a composition of MAC codes of all the port codes of the plurality of connecting port assemblies 110A-110C of the master device 100C. CDV1 is a group address code corresponding to the master basis MAC code of the master device 100C and the slave basis MAC code of the master device 200A.

If the master device 100C is matched to the slave device 200B, the identity information stored in the identity module 160 is a serial matching code: CDV2-200B-MAC01 (210*a*&210*b*&210*c*)-100C-MAC01(110A&110B&110C). 200B-MAC01(210*a*&210*b*&210*c*) is the slave basis MAC code of the slave device 200B. MAC01(210*a*&210*b*&210*c*) is a composition of MAC codes of all the port codes of the first coupling port 210*a*, the second coupling port 210*b*, and the third coupling port 210*c* of the slave device 200B. CDV2 is a group address code corresponding to the master basis MAC code of the master device 100C and the slave basis MAC code of the master device 200B.

If the master device 100C is matched to the slave device 200C, the identity information stored in the identity module 160 is a serial matching code: CDV3-200C-MAC01 (210*a*&210*b*&210*c*)-100B-MAC01(110A&110B&110C). 200C-MAC01(210*a*&210*b*&210*c*) is the slave basis MAC code of the slave device 200C. MAC01(210*a*&210*b*&210*c*) is a composition of MAC codes of all the port codes of the first coupling port 210*a*, the second coupling port 210*b*, and the third coupling port 210*c* of the slave device 200C. CDV3 is a group address code corresponding to the master basis MAC code of the master device 100C and the slave basis MAC code of the master device 200C.

The identity module 160 can include a MCU 161, an identity sending port 163, and a result receiving port 165. The MCU 161 is coupled to the MCU1-MCU3. The identity sending port 163 is configured to send out identity information serially. In at least one embodiment, the identity module 160 is a near-field wireless module, such as NFC module or IR module.

Each of the slave devices 200A-200C can further include an identify module 220. The identify module 220 stores a plurality of identify information, such as slave basis MAC codes, master basis MAC codes, and group address codes corresponding to each master device and slave devices matched to the master device.

If the slave device 200A is matched to each of the master devices 100A-100C, the identify information stored in the identify module 220 is a serial matching code: DV1-200A-MAC01(210*a*&210*b*&210*c*)-100A-MAC01 (110A&110B&110C); BDV1-200A-MAC01 (210*a*&210*b*&210*c*)-100B-MAC01(110A&110B&110C); and CDV1-200A-MAC01(210*a*&210*b*&210*c*)-100C-MAC01(110A&110B&110C).

If the master device 100A is matched to the slave device 200C, the identity information stored in the identity module 160 is three serial matching codes: DV3-200C-MAC01 (210*a*&210*b*&210*c*)-100A-MAC01(110A&110B&110C). 200C-MAC01(210*a*&210*b*&210*c*) is the slave MAC code of the slave device 200C. MAC01(210*a*&210*b*&210*c*) is a composition of MAC codes of all the port codes of the first coupling port 210*a*, the second coupling port 210*b*, and the third coupling port 210*c* of the slave device 200C. DV3 is a group address code corresponding to the basis MAC code of the master device 100A and the slave MAC code of the master device 200C.

Similar to the slave device 200A, if the slave device 200B is matched to each of the master devices 100A-100C, the identify information stored in the identify module 220 is three serial matching codes: DV2-200B-MAC01 (210*a*&210*b*&210*c*)-100A-MAC01(110A&110B&110C); BDV2-200B-MAC01(210*a*&210*b*&210*c*)-100B-MAC01 (110A&110B&110C); and CDV2-200B-MAC01 (210*a*&210*b*&210*c*)-100C-MAC01(110A&110B&110C).

Similar to the slave device 200A and the slave device 200B, if the slave device 200C is matched to each of the master devices 100A-100C, the identify information stored in the identify module 220 is three serial matching codes: DV3-200C-MAC01(210*a*&210*b*&210*c*)-100A-MAC01 (110A&110B&110C); BDV3-200C-MAC01 (210*a*&210*b*&210*c*)-100B-MAC01(110A&110B&110C); and CDV3-200C-MAC01(210*a*&210*b*&210*c*)-100C-MAC01(110A&110B&110C).

The identify module 220 can include an MCU 221, an identity receiving port 223, and a result sending port 225.

The MCU 221 is coupled to the MCU-a-MCU-c. The identity receiving port 223 is configured to receive the identity information sent serially from the identity sending port 163 and then send the identity information to the MCU 221 in order. The MCU 221 confirms whether the identity information corresponds to the slave devices. If yes, the MCU 221 defines the group address code from the identity information and activates the first coupling port 210a, the second coupling port 210b, and the third coupling port 210c to search and call up the plurality of connecting port assemblies 110A, 110B, and 110C via the I²C bus. The MCU 221 also drives the result sending port 225 to send the group address code and a connection-allowed signal to the result receiving port 165. The MCU 161 receives the group address code and then sends the group address code to the MCU1, MCU2, and MCU3 to start the connection between the master device and the slave device. The type of the identify module 220 is same as the type of the identity module 160.

Taking the master device 100A and the slave device 200A as an example, the master device 100A is moved near to the slave device 200A. The MCU 221 couples the identity information of the slave device 200A in a comparison area. The identity information of the slave device 200A reads DV1-200A-MAC01(210a&210b&210c)-100A-MAC01 (110A&110B&110C); BDV1-200A-MAC01 (210a&210b&210c)-100B-MAC01(110A&110B&110C); and CDV1-200A-MAC01(210a&210b&210c)-100C-MAC01(110A&110B&110C). The MCU 221 compares the DV1-200A-MAC01(210a&210b&210c)-100A-MAC01 (110A&110B&110C); BDV1-200A-MAC01 (210a&210b&210c)-100B-MAC01(110A&110B&110C); and CDV1-200A-MAC01(210a&210b&210c)-100C-MAC01(110A&110B&110C) to each of the identity information of the master device 100A, which read DV1-200A-MAC01(210a&210b&210c)-100A-MAC01 (110A&110B&110C), DV2-200B-MAC01 (210a&210b&210c)-100A-MAC01(110A&110B&110C), and DV3-200C-MAC01(210a&210b&210c)-100A-MAC01(110A&110B&110C), to find same identity information DV1-200A-MAC01(210a&210b&210c)-100A-MAC01(110A&110B&110C). Then, the MCU 221 defines the group address code DV1 from the identity information and starts the first coupling port 210a, the second coupling port 210b, and the third coupling port 210c to search and call up the plurality of connecting port assemblies 110A, 110B, and 110C via the I²C bus. The MCU 221 also drives the result sending port 225 to send the group address code DV1 and a connection-allowed signal to the result receiving port 165, the MCU 161 receives the group address code DV1 and then sends the group address code DV1 to the MCU1, MCU2, and MCU3 to start the connection between the master device 100A and the slave device 200A. Thus, the first connecting port 111A is coupled to the first coupling port 210a, the second connecting port 111B is coupled to the second coupling port 210b, and the third connecting port 111C is coupled to the third coupling port 210c. At the same time, the software code in the storage device 210d of the slave device 200A is coupled to the function control software FW1.

Figure 8:
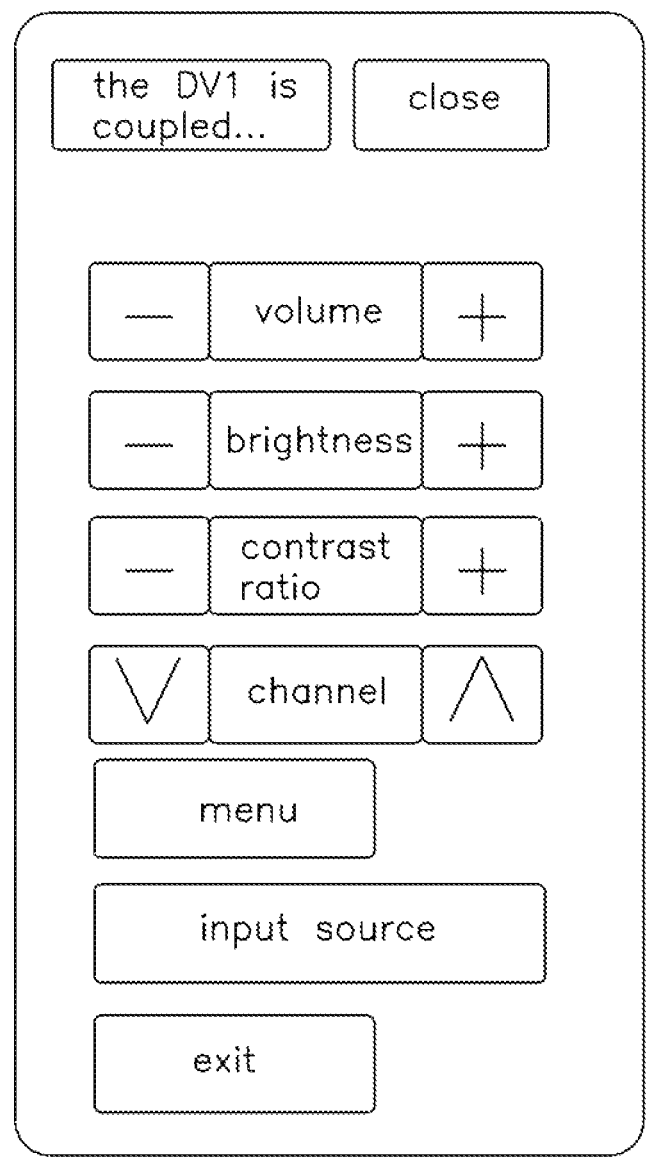
FIG. 8 shows a window of a display of the master device of FIG. 2 after coupling the master device to a selected slave device successfully.

Each of the master devices 100A-100C further includes a display module 150 coupled to the MCU 140. The display module 150 includes a screen 151. Referring to FIG. 8, when one the master devices 100A-100C is successfully coupled to a selected slave device, the screen 151 displays a plurality of function control windows corresponding to the selected slave device. If the selected slave device is a TV, the function control windows include a volume adjustment, a brightness adjustment, and a channel adjustment. If the selected slave device is a radio, the function control windows include a volume adjustment, a channel adjustment, and a power on/off control. When each function control window is clicked, the MCU 140 searches the function control software corresponding to the selected slave device in the third storage unit 110d and sends the necessary function control signal to the MCU1-MCU3 via the control bus. The MCU1-MCU3 sends the function control signal to the MCU-a, MCU-b, and MCU-c via the first connecting port 210a, the second connecting port 210b, and the third connecting port 210c. The MCU-a, MCU-b, and MCU-c perform the required function according to the function control signal. Thus, the master device can control the selected slave device on the screen 151.

Each slave device can further include a video/audio signal source 260, a universal serial bus (USB) hub 230, a video/audio signal process chip 240, and a display module 250.

The video/audio signal source 260 is coupled to the third coupling port 210c and can capture an image/sound of a voice and send the image/audio data to the master device 100 through the third connecting port assembly 210C. The image/audio data can be from a camera or from the MCU 140. The master device 100 and the slave devices 200 can display the image and playback the audio data.

The USB hub 230 is coupled to the first coupling port 210a, a keyboard 300, a mouse 400, and a hard disk drive 500. The keyboard 300 and the mouse 400 are taken as input devices and can simultaneously control the master device 100 and each of the slave devices 200A-200C coupled to the master device 100. In other embodiments, input device can be a touch pad. The hard disk drive 500 is taken as a storage device of each of the slave devices 200A-200C when each of the slave devices 200A-200C is coupled to the master device 100.

The video/audio signal process chip 240 is coupled to the second coupling port 210b and the display module 250 and configured to output video signals from the second connecting port 111B to the display module 250. The video/audio signal process chip 240 is further configured to output audio signals to an audio playback device with a wireless power amplifier (not shown).

Figure 9:
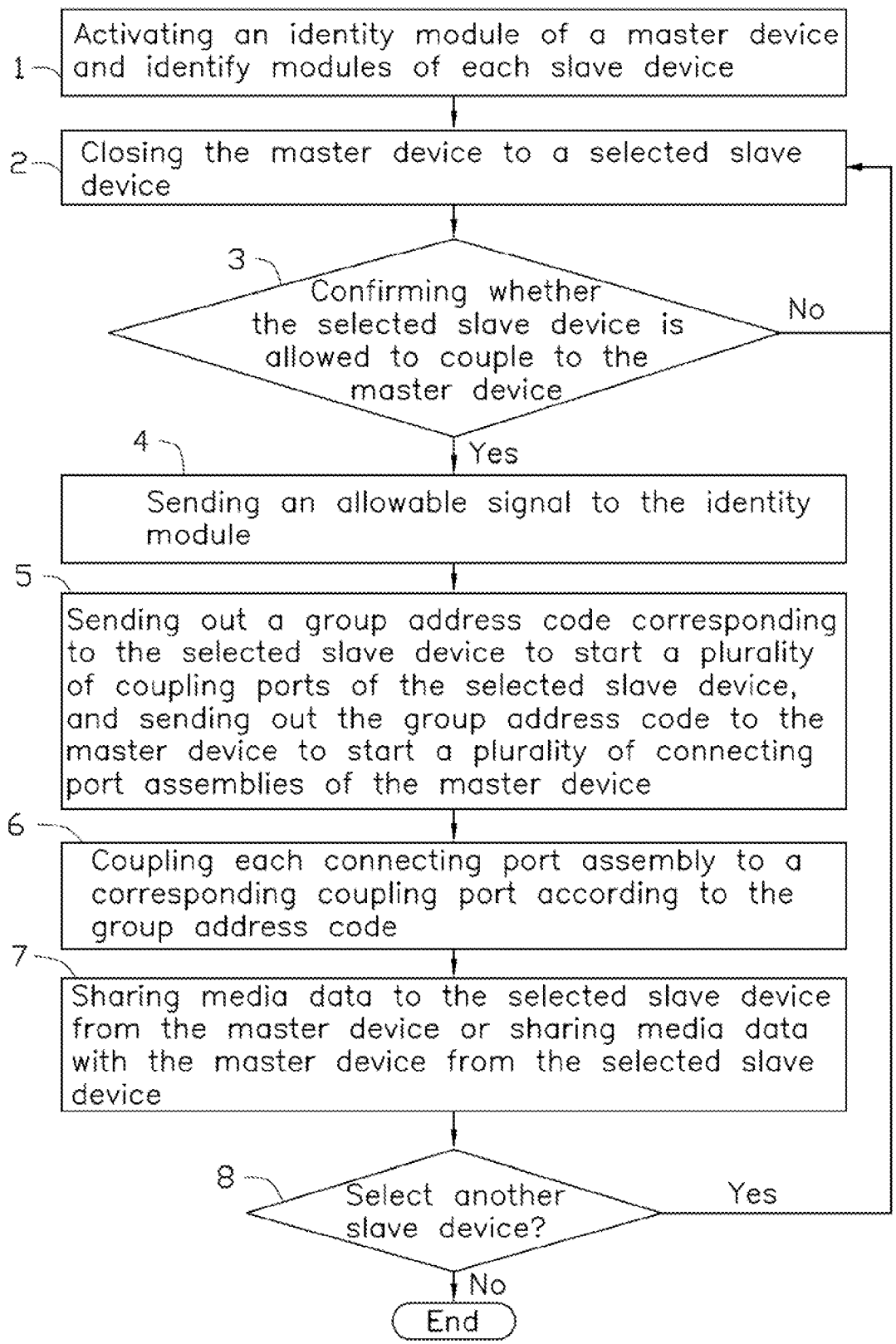
FIG. 9 is a flowchart of one embodiment of an electronic device coupling method.

Referring to FIG. 9, a flowchart is presented in accordance with an example embodiment of coupling method. The example method is provided by way of example, as there are a variety of ways to carry out the method. The method described below can be carried out using the configurations illustrated in FIGS. 1-8, for example, and various elements of these figures are referenced in explaining the example method. Each block shown in FIG. 9 represents one or more processes, methods, or subroutines, carried out in the example method. Furthermore, the illustrated order of blocks is illustrative only and the order of the blocks can change. Additional blocks can be added or fewer blocks may be utilized, without departing from this disclosure. The example method can begin at block 1.

At block 1, the identity module 160 of a master device and the identify modules 220 of the slave devices are activated. After the identity module 160 is activated, the identity sending port 163 of the identity module 160 sends out identity information serially. After the identify modules 220 are activated, the identity receiving ports 223 of the identify modules 220 wait for receiving the identity information. The identity information can be the serial matching codes or the group address codes.

At block 2, moving the master device to close to a selected slave device. The identity receiving ports 223 of the selected slave device receive the identity information.

At block 3, confirming whether the received identity information corresponds to identity information stored in the selected slave device. If yes, perform block 4, if not, repeat block 2.

At block 4, defining the group address code from the identity information by the MCU 221 of the selected slave device to start the coupling ports 210a-210c of the selected slave device to search and call up the connecting port assemblies 110A, 110B, and 110C of the master device via the I$^2$C bus.

At block 5, sending out the group address code and a connection-allowed signal to the result receiving port 165 by the result sending port 225.

At block 6, receiving the group address code by the MCU 161 of the master device and then sending the group address code to the MCUs of the connecting port assemblies 110A, 110B, and 110C of the master device via the I$^2$C bus to start the connecting ports 111A-111C and the connection between the coupling ports 210a-210c and the connecting ports 111A-111C.

At block 7, sharing media data to the selected slave devices from the master device or sharing media data with the master device from the selected slave devices. The media data may be photos, videos, or audio. In this situation, the keyboard 300 and the mouse 400 can control the master device 100 directly.

Block 4 and block 5 are performed simultaneously. Before block 1, a mapping form is stored in the storage module 143 of the MCU 140, in each connecting port assembly, and in each coupling module 210. The mapping form defines relationships about each group address code, each slave device symbol, each matching code, and each software matching code. Block 6 further includes displaying a function control window (shown as in FIG. 7) on the screen 151 which corresponds to the selected slave device. The function control window can be selected by means of the mouse 400 or the keyboard 400, to perform the functions of the selected slave device.

Figure 10:
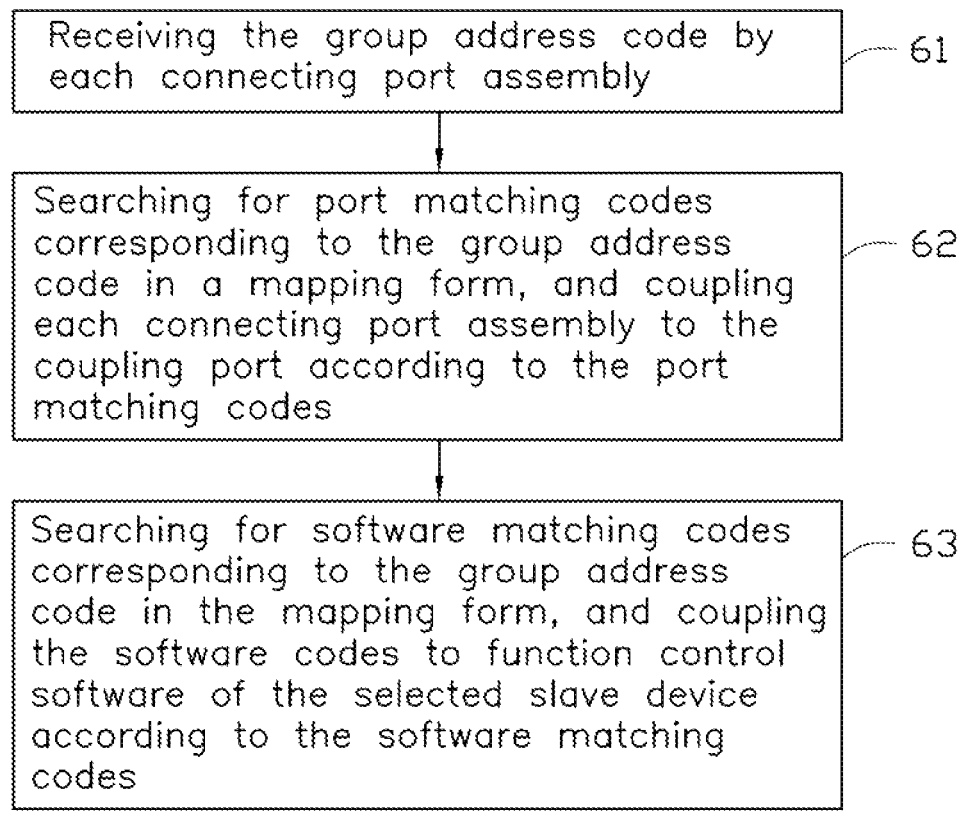
FIG. 10 is a flowchart of one embodiment of a block of the electronic device coupling method of FIG. 9.

Referring to FIG. 10, a flowchart is presented in accordance with an example embodiment of block 6. The example method is provided by way of example, as there are a variety of ways to carry out the method. The method described below can be carried out using the configurations illustrated in FIGS. 1-8, for example, and various elements of these figures are referenced in explaining the example method. Each block shown in FIG. 10 represents one or more processes, methods, or subroutines, carried out in the example method. Furthermore, the illustrated order of blocks is illustrative only and the order of the blocks can change. Additional blocks can be added or fewer blocks may be utilized, without departing from this disclosure. The example method can begin at block 61.

At block 61, receiving the group address code by each connecting port assembly of the connecting module 110.

At block 62, searching for the matching codes corresponding to the group address code in the mapping form, and coupling the connecting port of each connecting port assembly to the coupling port of the selected slave device, according to the matching codes.

At block 63, searching for the software matching codes corresponding to the group address code in the mapping form, and coupling the software codes to the function control software of the selected slave device, according to the software matching codes.

Each of the master devices 100A-100C can include a plurality of connecting modules. The connecting modules can have the same or different connecting port assemblies. The type of the connecting port assemblies can be HDMI, MHL, USB, DP, or E-SATA.

The embodiments shown and described above are only examples. Many details are often found in the art such as the other features of an electronic device coupling system and method. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. An electronic device coupling system, the system comprising:
    a master device comprising a connecting module and an identity module, the connecting module comprising a plurality of different types of connecting port assemblies; and
    a plurality of slave devices matched to the master device, each slave device comprising a coupling module and an identify module, and the coupling module comprising a plurality of different types of coupling ports;
    wherein the identity module stores identity information of each of the plurality of slave devices and is configured to send out all the identity information one by one and is configured to confirm whether the identity information corresponds to one of the slave devices;
    each of the plurality of different types of connecting port assemblies having a plurality of group address codes corresponding to the plurality of slave devices and a plurality of matching codes corresponding to each connecting port assembly and each group address code; and
    the master device is configured to be coupled to the selected slave device when the identity information is corresponding to the selected slave device; the coupling module is coupled to the connecting module; and the plurality of coupling ports are configured to be coupled to the connecting port assemblies respectively according to the matching codes.

2. The electronic device coupling system of claim 1, wherein the identity information is serial matching codes or the group address codes, and the serial matching codes are media access control (MAC) codes of the master device and the slave devices.

3. The electronic device coupling system of claim 1, wherein the identity module comprises an identity sending port configured to sending out the identity information and a result receiving port configured to receive a confirmation result; the identify module comprises a identity receiving port configured to receive the identity information and a result sending port configured to send out the confirmation result; the identify module is configured to confirm whether the identity information is corresponding to the selected slave device and drive the result sending port to send an allowable signal to the result receiving port when the identity information is corresponding to the selected slave device.

4. The electronic device coupling system of claim 3, wherein each connecting port assembly comprises a connecting port configured to be coupled to one of the coupling ports, a micro controller unit (MCU) coupled to the connecting port, and a storage module coupled to the MCU, the storage module comprises a first storage unit, a second storage unit, and a third storage unit; the first storage unit stores the matching codes; the second storage unit stores the group address code; the third storage unit is configured to store function control software of each slave device corresponding to each group address code; when the identity information is corresponded to the selected slave device, the identify module sends out the group address code to start the coupling ports, the group address code is also sent to the identity receiving port to start the connecting port assemblies and start the connection between coupling ports and the connecting ports; and the group address code further drives the function control software to couple to the selected slave device.

5. The electronic device coupling system of claim 4, wherein each slave device has a plurality of software codes; and when the master device is coupled to the selected slave device, the software codes is coupled to the function control software, and enable the software and hardware to be synchronously coupled to the selected slave device and the master device.

6. The electronic device coupling system of claim 5, wherein each connecting port assembly further has a plurality of software matching codes, stored in the third storage unit, corresponding to each group address code, and the software codes is coupled to the function control software according to the software matching codes.

7. The electronic device coupling system of claim 6, wherein the MCU stores a mapping form, the mapping form defines mapping relationships about each group address code, each matching code, and each software matching code.

8. The electronic device coupling system of claim 4, wherein the type of each connecting port is same as the corresponding coupling port and is different from the connecting ports in each other connecting port assemblies.

9. The electronic device coupling system of claim 1, wherein the connecting port assemblies comprises a high definition multimedia interface (HDMI) connecting port assembly, a mobile high definition link (MHL) connecting port assembly, a universal serial bus (USB) connecting port assembly, or a Clipsal bus (CBUS) connecting port assembly.

10. The electronic device coupling system of claim 1, wherein the master device further comprises a USB hub configured to couple to a first coupling port of the coupling module, an input device and a storage device are configured to couple to the USB hub.

11. The electronic device coupling system of claim 1, wherein the master device further comprises a video/audio signal source coupled to a third coupling port of the coupling module, and the video/audio signal source is configured to send video/audio signal to the one slave device.

12. The electronic device coupling system of claim 11, wherein the master device further comprises a video/audio signal process chip coupled to a second coupling port of the coupling module, and the video/audio signal process chip is configured to send video/audio signal from the one slave device to the master device.

13. The electronic device coupling system of claim 12, wherein the master device further comprises a display module coupled to the video/audio signal process chip and configured to display videos of the video signal from the video/audio signal process chip.

14. An electronic device coupling method comprising:
activating an identity module of a master device and identify modules of each slave device successfully matched to the master device;
closing the master device to a selected slave device;
confirming whether the selected slave device is allowed to couple to the master device, and sending an allowable signal to the identity module when the selected slave device is allowed to couple to the master device by the identify module;
sending out a group address code corresponding to the selected slave device start a plurality of coupling ports of the selected slave device, and sending out the group address code to the master device to start a plurality of connecting port assemblies of the master device;
coupling each connecting port assembly to a corresponding coupling port according to a plurality of port matching codes; and
sharing media data to the selected slave device from the master device or sharing media data with the master device from the selected slave device;
wherein the plurality of port matching codes corresponding to each connecting port assembly and each group address code.

15. The electronic device coupling method of claim 14, further comprising:
storing a mapping form in the master device, the mapping form defines mapping relationships about each group address codes, each slave device, the plurality of port matching codes, and a plurality of software matching codes; the connecting port assembly of the connecting module is coupled to the corresponding coupling port according to the port matching codes before activating an identity module of a master device and identify modules of each slave device successfully matched to the master device.

16. The electronic device coupling method of claim 15, wherein coupling each connecting port assembly to a corresponding coupling port according to the group address code further comprises:
receiving the group address code by a connecting port of each connecting port assembly;
searching the port matching codes corresponding to the group address code in the mapping form, and coupling the connecting port to the corresponding coupling port according to the port matching codes; and
searching the software matching codes corresponding to the group address code in the mapping form, and coupling software codes to function control software of the selected slave device according to the software matching codes.

17. The electronic device coupling method of claim 14, further comprising:
sending out identity information stored in the identity module one by one by the identity module; and
waiting for receiving the identity information and confirming the identity information by the identify module.

18. The electronic device coupling method of claim 17, wherein the identity information is serial matching codes or the group address codes, and the serial matching codes are MAC codes of the master device and the slave devices.

19. The electronic device coupling method of claim 18, wherein confirming whether the selected slave device is allowed to couple to the master device, and sending an allowable signal to the identity module when the selected slave device is allowed to couple to the master device by the identify module further comprises:
   receiving the identity information by an identity receiving port of the identify module;
   confirming whether the identity information is corresponding to the selected slave device; and
   sending the allowable signal to the identify module when the identity information is corresponded to the selected slave device.

* * * * *